Figure 1:
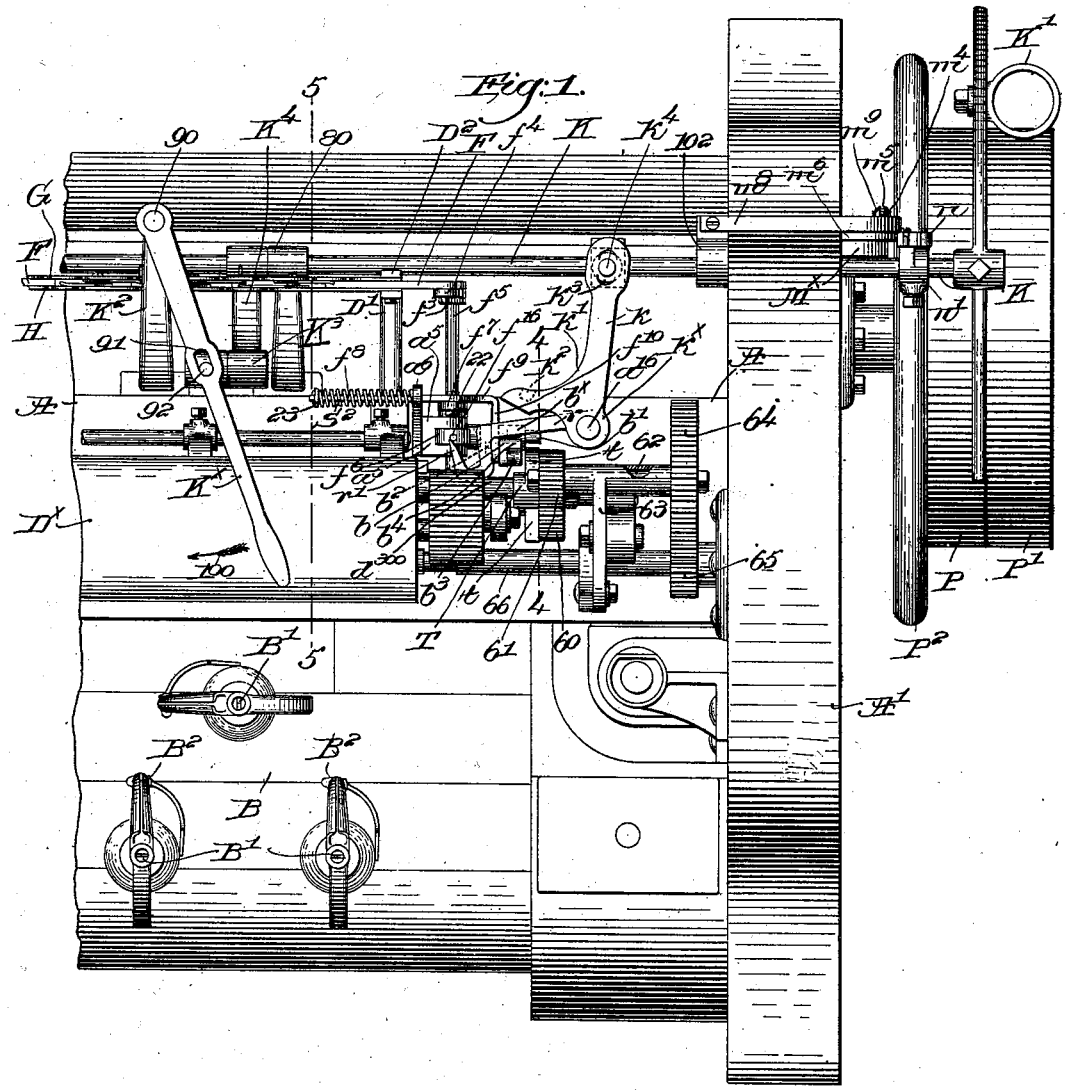

No. 724,574. PATENTED APR. 7, 1903.
C. T. HAWLEY.
STOP MOTION FOR MACHINES FOR PREPARING FIBROUS MATERIAL.
APPLICATION FILED JAN. 27, 1902.
NO MODEL. 5 SHEETS—SHEET 1.

Witnesses,
Edward F. Allen.
Thomas J. Drummond.

Inventor,
Charles T. Hawley,
by Crosby & Gregory,
Attys.

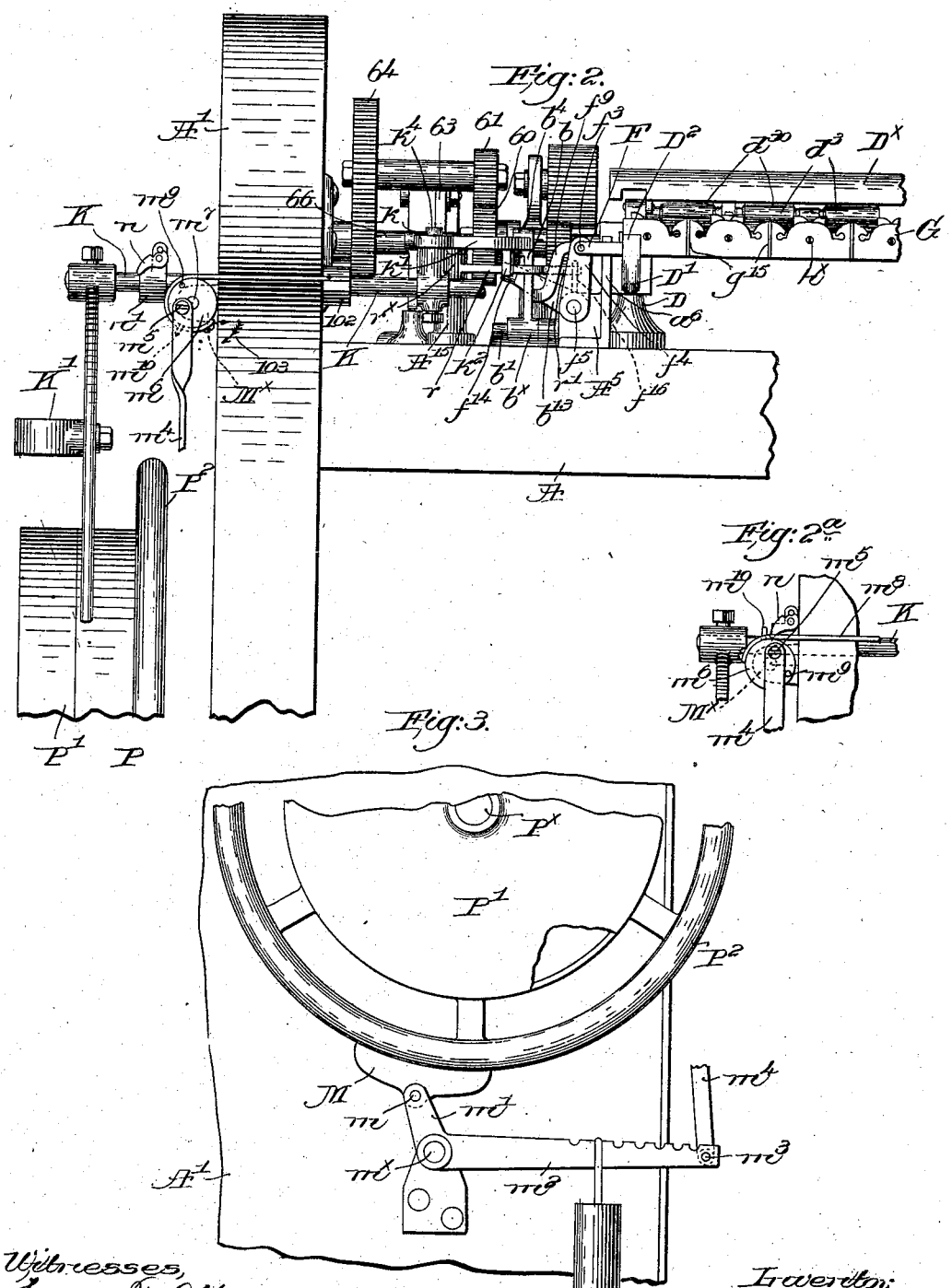

No. 724,574. PATENTED APR. 7, 1903.
C. T. HAWLEY.
STOP MOTION FOR MACHINES FOR PREPARING FIBROUS MATERIAL.
APPLICATION FILED JAN. 27, 1902.
NO MODEL. 5 SHEETS—SHEET 3.
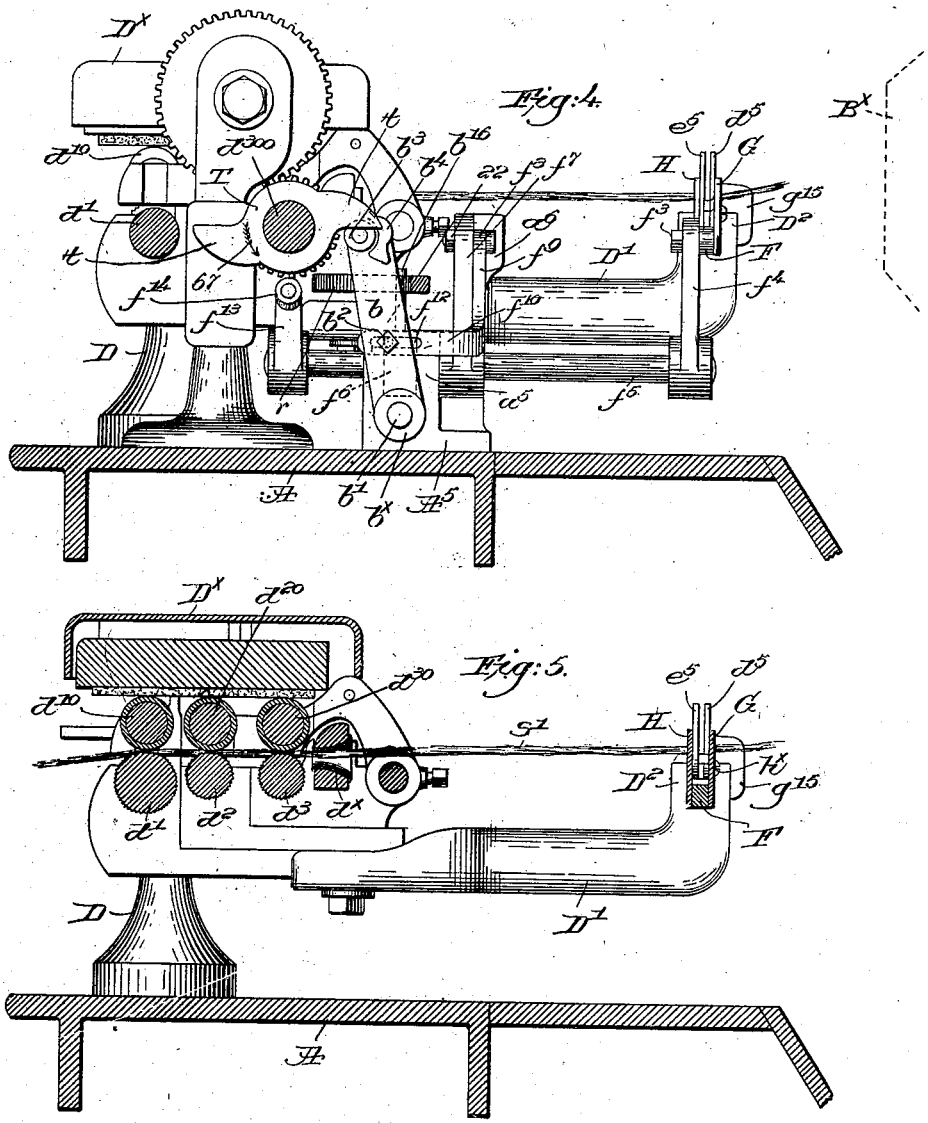

No. 724,574. PATENTED APR. 7, 1903.
C. T. HAWLEY.
STOP MOTION FOR MACHINES FOR PREPARING FIBROUS MATERIAL.
APPLICATION FILED JAN. 27, 1902.
NO MODEL. 5 SHEETS—SHEET 4.
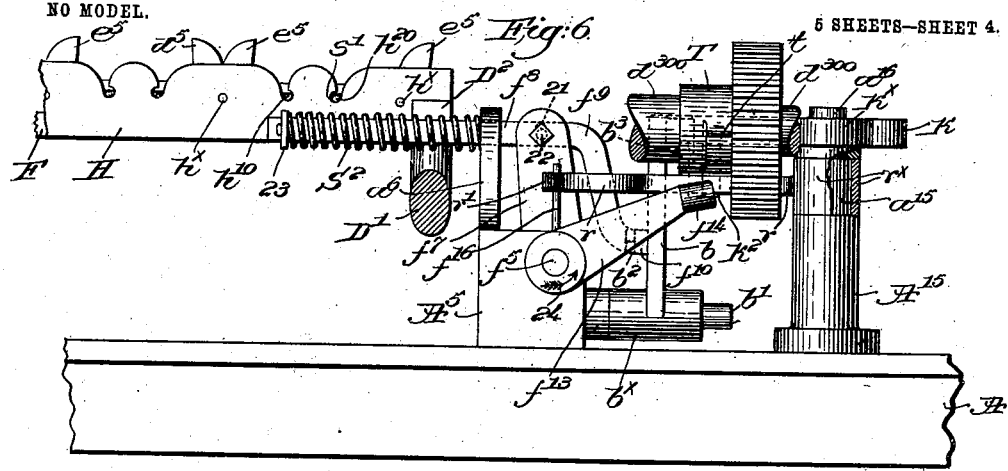
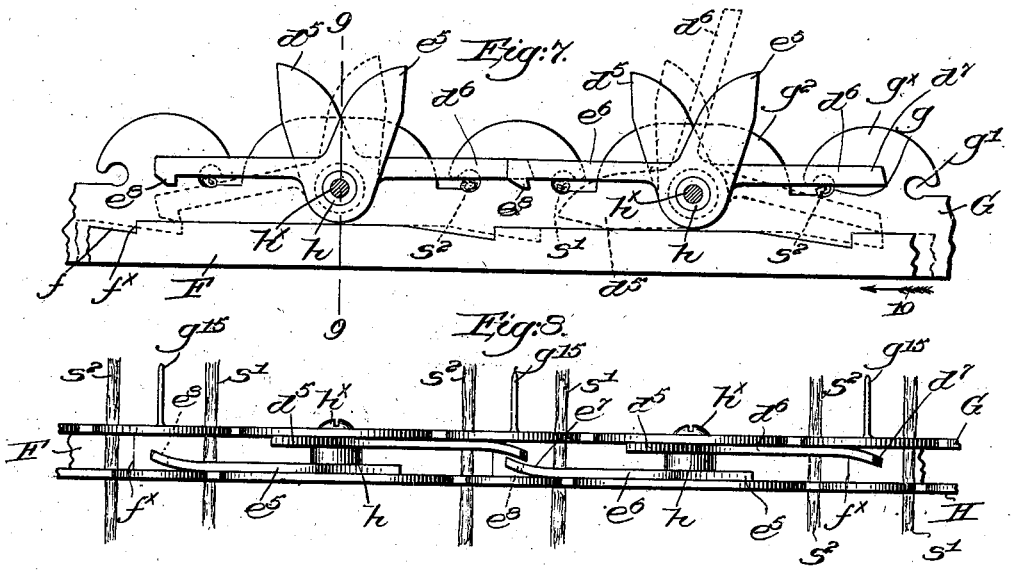
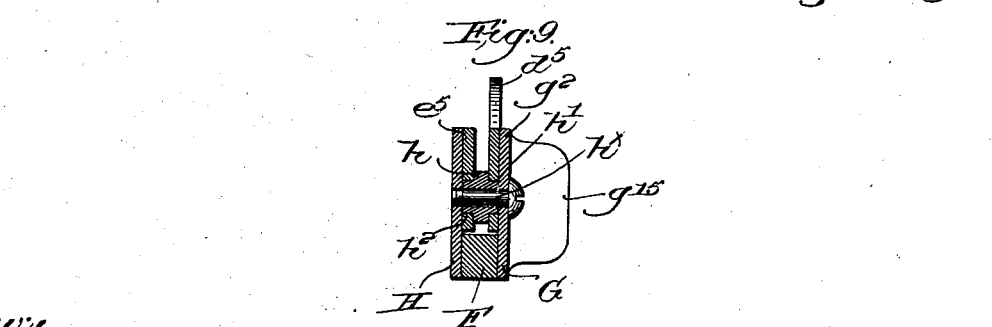
Witnesses,
Edward F. Allen.
Thomas J. Drummond.
Inventor:
Charles T. Hawley,
by Crosby & Gregory
Attys.

No. 724,574. PATENTED APR. 7, 1903.
C. T. HAWLEY.
STOP MOTION FOR MACHINES FOR PREPARING FIBROUS MATERIAL.
APPLICATION FILED JAN. 27, 1902.
NO MODEL. 5 SHEETS—SHEET 5.
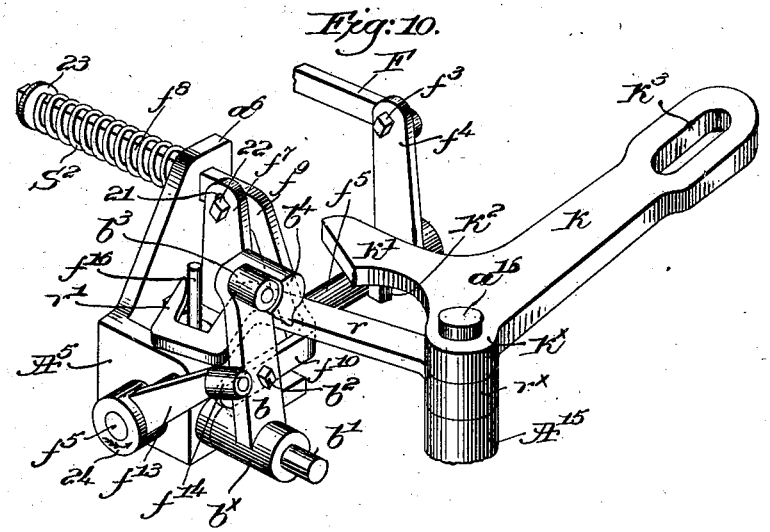
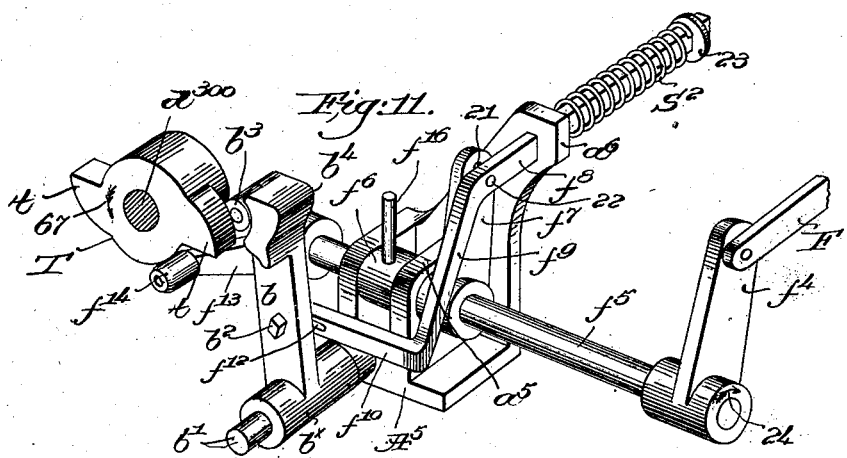
Witnesses
Edward F. Allen.
Herman J. Sartoris.
Inventor
Charles T. Hawley,
by Crosby Gregory
attys.

UNITED STATES PATENT OFFICE.

CHARLES T. HAWLEY, OF HOPEDALE, MASSACHUSETTS, ASSIGNOR TO DRAPER COMPANY, OF HOPEDALE, MASSACHUSETTS, A CORPORATION OF MAINE.

STOP-MOTION FOR MACHINES FOR PREPARING FIBROUS MATERIAL.

SPECIFICATION forming part of Letters Patent No. 724,574, dated April 7, 1903.

Application filed January 27, 1902. Serial No. 91,343. (No model.)

*To all whom it may concern:*

Be it known that I, CHARLES T. HAWLEY, a citizen of the United States, residing at Hopedale, county of Worcester, State of Massachusetts, have invented an Improvement in Stop-Motions for Machines for Preparing Fibrous Material, of which the following description, in connection with the accompanying drawings, is a specification, like characters on the drawings representing like parts.

In machines for preparing fibrous material—such as slubbing, intermediate, and roving frames—a plurality of slivers are led through suitable guides and united into one roving by suitable drawing-rolls, the latter attenuating the slivers, and thereby decreasing their strength, which loss is compensated for by imparting twist to the roving as it is wound upon a suitable bobbin, the twist being produced by a flier, for instance. Now if one sliver of a set breaks without immediate detection and piecing up the roving of that set will not be uniform or of the requisite thickness and "singles," as technically termed, will be formed. Various devices have been employed for preventing singles, such apparatus providing for the automatic breakage of a sliver upon the accidental breakage of its fellow in the set, so that a single is prevented; but manifestly there is thus created a break in the roving of such set. In a frame provided with a number of rotatable spindles to support bobbins upon which a corresponding number of rovings are wound it is usual to provide driving mechanism which drives the rolls, fliers, and traverse devices at constant speed, and the spindles, with the bobbins thereon, are driven at variable speed to give constant surface speed to the bobbins as they increase in size, such speed being the same for all of the spindles at any given time. It will be manifest, therefore, that if upon breakage of a sliver of any one set its fellow is broken, automatically preventing a single, but causing a break in the roving, the bobbin to which the latter is delivered will fall behind the others by just so much time as elapses before the break is repaired and the delivery of the roving continued. The roving on a drawing-frame is so slack-twisted that it will stand no drag, as by a traveler on a spinning-ring, but it must be laid on the bobbin at exactly the same speed it is delivered by the rolls—that is, the difference in speed of rotation between the flier and the bobbin must vary, so that this difference at any time multiplied by the circumference of the bobbin at the same time shall give a constant which is equal to the length of roving delivered by the rolls in the given time less a certain percentage taken up in twist. Consequently if a bobbin is allowed to run without roving for any considerable length of time it is too small when pieced up for the difference in speed then found, and there is too small surface speed relative to the flier, and the roving is not wound upon the bobbin as fast as it is delivered by the rolls. It is thus impossible to run a bobbin materially smaller than the others in the set. It is necessary, therefore, in an apparatus of this character to stop the frame as a whole when for any reason the continuity of any roving is interrupted and when a sliver of any set breaks.

My present invention has for its object the production of a novel stop-motion for apparatus of the class described whereby the apparatus as a whole is stopped automatically by or through the breakage of a sliver of any set, so that not only are singles prevented, but the output of the frame is made substantially uniform and very perfect.

The various novel features of my invention will be fully described hereinafter and particularly pointed out in the following claims.

Figure 1 is a top or plan view of the driving end of a machine for preparing fibrous material with one embodiment of my invention applied thereto, the apparatus being at rest. Fig. 2 is a rear elevation of the apparatus shown in Fig. 1, the bobbins from which the slivers are drawn being omitted to more clearly show the novel parts of the apparatus. Fig. 2ª is a detail of the brake-controlling mechanism to be described. Fig. 3 is a detail of a part of the brake mechanism in side elevation viewing Fig. 2 from the left. Fig. 4 is a transverse sectional detail, enlarged, on the the line 4 4, Fig. 1, looking toward the left. Fig. 5 is a similar view, also enlarged, on the line 5 5, Fig. 1, looking toward the left. Fig. 6 in an enlarged detail of the stop-motion and its controlling means viewed from the front of the frame, the drawing-rolls being omitted. Fig. 7 is an enlarged detail, in front elevation, of the detectors and the co-operating feeler, the front plate being omitted. Fig. 8 is a top or plan view of the same, but with the front plate in place; and Fig. 9 is a sectional detail on the line 9 9, Fig. 6, looking toward the left. Fig. 10 is an enlarged perspective detail of the stop-motion and its controlling means viewed from the front right-hand end of the frame shown in Fig. 1; and Fig. 11 is also a perspective detail of the same mechanism, but viewed from the back of the frame, with the knock-off lever and detector-releasing device omitted and the tappet-cam shown.

Referring to Figs. 1 to 5, the main frame A, having one end A' made box-like to receive the usual driving mechanism (not shown) and of well-known structure in machines of this class, the spindle-rail B, the rotatable spindles B', Fig. 1, and their fliers $B^2$, the stands D for the sets or heads of drawing-rolls, the lower rolls being indicated at $d'$ $d^2$ $d^3$, Fig. 5, and the upper rolls at $d^{10}$ $d^{20}$ $d^{30}$, the trumpet $d^\times$, by which the several slivers of a set are collected as they pass to the rolls, and the roll-cover $D^\times$ may be all of usual or well-known construction, the slivers being drawn from bobbins $B^\times$ at the back of the frame. (See dotted lines, Fig. 4.) Rearwardly-extended ⌐-shaped brackets D' are secured to the stands D, and their upturned ends $D^2$ are notched to support two parallel longitudinal guide bars or plates G H, located at a considerable distance back of the rolls, the plate G having guide-eyes $g$ $g'$, arranged in pairs back of each set of rolls, the arrow-headed part $g^\times$ of the plate between the eyes of each pair acting with the alternating convex portions $g^2$, Figs. 2 and 7, to direct the slivers readily to the guide-eyes, the overhanging portions of the arrow-heads preventing accidental displacement of the slivers, while the stem separates the slivers $s'$ $s^2$ of each pair. The plates G and H are held together by a series of screw-studs $h^\times$, Figs. 7, 8, and 9, passed through plate G and screwed into plate H, and a sleeve $h$, having its ends reduced in diameter to form fulcrum-seats $h'$ $h^2$, is slipped onto each stud between the plates to maintain them separated while holding them firmly in position. Guide-eyes $h^{10}$ $h^{20}$ in plate H are located in front of the eyes $g$ $g'$ for the slivers $s'$ $s^2$ of a set, herein two slivers constituting a set, they being led from bobbins $B^\times$. (See dotted lines, Fig. 4.)

I have herein shown two series of detectors mounted on and to rock upon the fulcrum-seats $h'$ $h^2$, respectively, the body portions of the sleeves $h$ maintaining the two series of detectors separated, and while in the main the detectors are alike I have for convenience indicated them by different reference-letters. The rearmost series of detectors, mounted on the seats $h'$, comprise each an upturned head $d^5$ and a lateral arm $d^6$, extended from the base of the head, and, referring to Figs. 7 and 8, it will be seen that the arms are extended toward the right, and they are long enough to cross the paths of the slivers $s^2$ of each set between the guide-eyes $g$ $h^{10}$. The detectors of the front series, mounted on the seats $h^2$, comprise upright heads $e^5$ and lateral arms $e^6$; but the latter extend toward the left and cross the paths of the slivers $s'$ between their guide-eyes $g'$ $h^{20}$, and, referring to Fig. 8, the extremities of the arms are bent rearwardly, as at $e^7$, and on their under edges are shaped to form downturned hooks $e^8$, Fig. 7. The free ends of the arms $d^6$ are bent forward, as at $d^7$, and are squared, and by reference to Fig. 8 it will be manifest that the detectors of one series will not interfere with those of the other series. The arm of each detector normally rests upon and is supported by an intact sliver, maintaining the detector in full-line position, Fig. 7, and in order that the strain upon the sliver may be very slight the detector-head is made at an obtuse angle to its arm, serving as a counterpoise.

A feeler, shown as a long bar F, is mounted to reciprocate longitudinally between the plates G and H below the detectors, the feeler having on its upper face a series of notches $f$ to present upright square shoulders $f^\times$, and as the feeler is reciprocated by means to be described the shoulders move back and forth below the free ends of the detector-arms. If, however, a sliver breaks or becomes so attenuated that it cannot support its detector in normal inoperative position, the detector will rock on its fulcrum-seat and engage one of the shoulders $f^\times$, arresting the movement of the feeler and through means to be described stopping the frame automatically. The stroke of the feeler in the direction of arrow 10, Fig. 7, is its feeling stroke, and if one of the back series of detectors is released its arm $d^6$ will drop into one of the notches $f$ and engage the adjacent shoulder $f^\times$, stopping the movement of the feeler. If one of the front series of detectors is released, its arm $e^6$ will drop, and the hook $e^8$ will engage the nearest shoulder $f^\times$, and so stop the feeler.

The stopping strain on the back series of detectors is compressive and tensile on the front series, and by bending the free ends of the detector-arms toward the longitudinal center of the feeler the stopping power is applied centrally thereof.

In Fig. 7 I have shown in dotted lines a detector of each series in released or operative position, and I have also shown at the right in said figure one of the detectors thrown over to swing its arm $d^6$ up out of the way while piecing up a broken sliver.

An upright thin blade $g^{15}$ is secured to each portion $g^\times$ of the guide-bar G between the two slivers of its set to prevent any accidental engagement thereof as they approach the guide-eyes $g\ g'$, the blades serving as separators.

The end of the feeler F nearest the driving end of the frame is pivotally connected at $f^3$ loosely with an upturned arm $f^4$, secured to a transverse rock-shaft $f^5$, Figs. 1, 2, 4, 6, 10, and 11, mounted in bearings $a^5$ on a stand $A^5$, secured to the top of the frame, a collar $f^6$ being secured to the rock-shaft between the bearings and preventing its endwise movement. A second upturned arm $f^7$ on the rock-shaft has connected to it by a slot-and-pin connection 21 22, Figs. 6 and 10, a peculiarly-shaped bar, the straight part $f^8$ thereof being mounted to slide in a hole in an upturned portion $a^6$ of the stand $A^5$, and a spring $S^2$ surrounds the bar between the stand and a collar 23, normally tending to maintain the parts in the position shown. The spring rocks the rock-shaft in the direction of arrow 24, Figs. 6 and 10, and thereby imparts the feeling stroke to the feeler F.

Referring to Figs. 1, 4, 6, 10, and 11, the bar $f^8$ is bent down at $f^9$ and then forward at $f^{10}$ toward the front of the frame, with a longitudinal slot $f^{12}$ therein (see Figs. 4 and 11) to receive loosely a headed stud $b^2$, projecting from the side of a bunter $b$, shown as an arm, having its hub $b^×$ mounted to rock and also to slide longitudinally on a fixed stud $b'$, secured to the base of the stand $A^5$ at right angles to the rock-shaft $f^5$. A friction-roll $b^3$ is mounted on the upper end of the bunter $b$, and the latter has an enlargement $b^4$ behind said roll for a purpose to be described. The rock-shaft $f^5$, which may be termed the "feeler rock-shaft," has secured to it a third arm $f^{13}$ at or near its front end, said arm being turned toward the adjacent end of the frame and having preferably a roll $f^{14}$ mounted on its free end in the path of the tappets $t\ t$ of a tappet-cam T, Figs. 4 and 11, secured to the shaft $d^{300}$, the latter being attached to or a continuation of the lower back rolls $d^3$ and of usual construction. A gear 60 on said shaft $d^{300}$ meshes with a pinion 61 on an intermediate shaft 62, Fig. 1, supported in a bracket 63 on the frame, a large gear 64 on the shaft 62 in turn meshing with a pinion 65 on the extension 66 of the lower front rolls $d'$, all of usual or well-known construction, the shaft 66 deriving its rotation from the driving mechanism (not shown) in the inclosed end $A'$ of the frame, and by such train of gearing the shaft $d^{300}$ is rotated in the direction of arrow 67, Fig. 4. As each tappet $t$ engages the roll $f^{14}$ it will depress the arm $f^{13}$ and turn the feeler-shaft $f^5$ oppositely to the arrow 24, Figs. 6, 10, and 11, and the arm $f^4$ will move the feeler F opposite to arrow 10, Fig. 7, for the non-feeling stroke, the spring $S^2$ returning the feeler-shaft to position shown in Figs. 6, 10, and 11 as soon as the point of the tappet passes the roll $f^{14}$. The feeler will be reciprocated twice for each complete rotation of the cam-shaft $d^{300}$, as will be manifest from the foregoing, and the feeling stroke of the feeler will be due to the expansion of the spring $S^2$, so that if the feeler is arrested by a released detector, as has been described, the strain on the detector will be due only to the power of such spring. Every time the arm $f^{14}$ is depressed by a tappet the bar $f^8\ f^{10}$ is moved bodily to the right, Figs. 1 and 6, and the bunter $b$ is slid along on the stud $b'$ to bring the roll $b^3$ into the path of the tappet $t$ which is then acting on arm $f^{13}$; but normally the feeling stroke of feeler F will take place and the bunter will be drawn back before the tappet can engage its roll. If, however, a sliver breaks and releases its detector, the latter will engage and arrest the movement of the feeler on its feeling stroke, and the bar $f^8\ f^{10}$ will maintain the bunter in operative position, so that the tappet will after passing from the roll $f^{14}$ engage the bunter-roll $b^3$, and thereby swing the bunter back, or to the right, Fig. 4, on its fulcrum-stud $b'$, the stud $b^2$ then traveling in the slot $f^{12}$. Such movement of the bunter operates to automatically stop the entire frame, as will now be described.

A post $A^{15}$ on the frame, near its driving end, has upright bearings $a^{15}\ a^{16}$, Fig. 6, the former receiving the hub $r^×$ of a detector-releasing device, shown in Figs. 1 and 10 as an arm $r$, supported to swing in a horizontal plane and having a cam-hook $r'$ at its free end to coöperate with a pin $f^{16}$ on the collar $f^6$, fast on the feeler rock-shaft $f^5$, as clearly shown in Fig. 11. The upper bearing $a^{16}$ receives the hub $k^×$ of a horizontally-swinging knock-off lever $k\ k'$, the arm $k'$ having a depending lug $k^2$, Figs. 1, 2, 6, and 10, behind and in the path of the hooked arm $r$. A longitudinal slot $k^3$ in the arm $k$ of the knock-off lever is entered by a pin $k^4$ on the shipper-rod K, mounted to slide in suitable bearings 80, one of which is shown in Fig. 1, the rod passing through the box-like end $A'$ of the frame, and beyond the latter a suitable belt-guide $K'$ is secured to the shipper-rod to shift the driving-belt (not shown) from the fast pulley P to the loose pulley $P'$, and vice versa, said pulleys being mounted on the main driving-shaft $P^×$ of the frame. (See Fig. 3.) A shipper $K^×$, Fig. 1, is fulcrumed at 90 on a fixed bracket $K^2$ and connected by a slot-and-pin connection 91 92 with a slide $K^3$, having an arm $K^4$ rigidly secured to the shipper-rod, so that the latter may be moved by hand to stop as well as to start the frame.

For convenience in illustration I have shown the frame as stopped by hand in Fig. 1, the belt being then on the loose pulley $P'$, and the knock-off lever $k\ k'$ will be in the position shown; but the other parts of the stop-motion are shown in the positions assumed at the termination of the feeling-stroke of feeler F.

To start the frame, the shipper $K^×$ is swung in direction of arrow 100, Fig. 1, and the inward sliding movement of the shipper-rod will throw the end $k'$ of the knock-off lever forward to a position just behind and in the path of movement of the enlargement $b^4$ of the bunter $b$ when the latter is swung to the right, Figs. 4 and 10, by the tappet-cam upon arrest of the feeler by a released detector, as has been described. The depending lug $k^2$ serves to position the hooked arm $r$, as shown in Figs. 1 and 10, when the knock-off lever is moved to running position.

So long as the slivers of the various sets remain intact the frame will run; but upon release of a detector the feeler is arrested, the tappet-cam engages the bunter-roll $b^3$, and the bunter $b$ is operated, being swung back so that its enlargement $b^4$ will engage the arm $k'$ and turn the knock-off lever on its fulcrum $a^{16}$ from normal position into the position shown in Figs. 1 and 10, thereby moving the shipper-rod to shift the belt to the loose pulley and stop the frame. The release of any detector, therefore, by or through breakage of its sliver will thus be made effective to automatically stop the frame. The bunter $b$ also engages the hooked arm $r$ at such time and swings the latter toward the back of the frame, it being remembered that the pin $f^{16}$ has been swung to the right, Fig. 6, by the turning of the feeler rock-shaft $f^5$ oppositely to arrow 24; but as the arm $r$ approaches its final position its cam-hook $r'$ engages the pin $f^{16}$ and gives it a slight increment of movement toward the right, still referring to Fig. 6 or to Fig. 1. Such slight movement is sufficient, acting through the intervening connections between the rock-shaft $f^5$ and the feeler F, to move the latter against the spring S far enough to take off the pressure from the detector which arrested the feeler, so that the attendant can with a touch of his finger throw such detector into inoperative position during piecing up of the broken sliver. This pressure-relieving feature is of great convenience, as it obviates the necessity of moving the feeler by hand, so that the released detector can be disengaged therefrom—a rather difficult and awkward matter to accomplish manually—and by effecting it automatically the time and attention of the attendant are free to be devoted to the piecing up of the broken sliver and starting the frame with as little loss of time as possible.

By detecting breakage at a considerable distance back of the drawing-rolls, as will be seen from Figs. 1 and 4, the stoppage of the frame will be effected before the broken end of sliver can reach the rolls—an important feature of my invention—for piecing up is then accomplished back of the rolls, and consequently the sliver does not have to be led or reintroduced between the rolls. Time is thus economized and piecing up is more easily done back of the rolls in the open and easily-accessible part of the frame.

Heretofore the detecting devices have been placed so close to the rolls, so far as I am aware, that the broken end would run partly or entirely through the rolls.

I have provided simple brake mechanism to operate automatically when the power is thrown off the frame to effect prompt stoppage of the parts, and the brake mechanism is shown in Figs. 1, 2, and 3 with the brake set, and in Fig. $2^a$ a part of the brake-controlling means is shown in normal position when the frame is running.

The usual hand-wheel $P^2$, secured to or forming a part of the fast pulley, is utilized as the rotatable member of the brake mechanism, and coöperating therewith is a shoe M, pivotally connected at $m$ to the short arm $m'$ of a bell-crank lever $m^2$, fulcrumed at $m^\times$ on a suitable bracket secured to the end $A'$ of the frame, as shown at Fig. 3, a weight W hung on the long arm $m^2$ constituting the brake-actuator. The lower end of a link $m^4$ is pivotally connected at $m^3$ with the free end of the arm $m^2$, the upper end of the link being eccentrically connected by a wrist-pin $m^5$ with a disk $m^6$, rotatably mounted at $m^7$ on a suitable bracket $M^\times$ on the frame. A flexible band $m^8$, attached at one end to the periphery of the disk $m^6$ and wound partly around the same, as clearly shown in Fig. 2, is secured at its other end to a collar 102, fast on the shipper-rod K, and when the latter is in stopping position the link $m^4$ will drop sufficiently to permit the brake to be set by its actuator W. When the shipper-rod is moved to start the frame, the band $m^8$ turns the disk $m^6$ in the direction of the arrow 103, Fig. 2, into the position shown in Fig. $2^a$, the upper end of the link $m^4$ passing dead-center and meeting a stop-pin $m^9$, and at the same time a starting-pin $m^{10}$ on the disk will be located just in advance of a pawl $n$, mounted on a collar $n'$, secured to the shipper-rod. (See Fig. $2^a$.) When the shipper-rod is moved to the left, Fig. $2^a$, the pawl will engage the pin $m^{10}$, and thereby turn the disk $m^6$ far enough to throw the link $m^4$ beyond dead-center, and immediately thereafter the actuator W will be free to act to apply the brake as the shipper-rod reaches its final position for stopping. (Shown in Fig. 2.)

The prevention of singles and the stoppage of the apparatus herein described is effected upon failure of any sliver, and by the term "failure" I mean either the breakage of a sliver or, what is quite as important, the running out of a sliver from the bobbin from which it is drawn. These bobbins to a large number are mounted on a stand at the back of the frame in well-known manner, and it is not only very difficult but practically impossible for the attendant to keep a strict watch on all of the bobbins to see that they do not run out.

By my invention the frame is stopped automatically when a sliver runs out and the attention of the operator is at once directed to the fault by such stoppage, and the particular sliver which has run out or which has broken is indicated by the abnormal position of the head of its detector.

The formation of singles by running out is now very common, and manifestly without proper checking means a sliver may run out for some time before the operative discovers it. This is absolutely prevented by the mechanism herein shown.

The mechanism hereinbefore described, and illustrated in the accompanying drawings, embodies one practical embodiment of my invention in the best form now known to me; but manifestly various changes or modifications may be made in construction and arrangement of the several parts by those skilled in the art without departing from the spirit and scope of my invention.

Having thus fully described my invention, what I claim as new, and desire to secure by Letters Patent, is—

1. In apparatus of the class described, means to move and to guide a plurality of sets of slivers in pairs, two series of pivotally-mounted detectors each having a sliver-engaging portion, one sliver of each set normally maintaining inoperative a detector of one series, the other slivers similarly controlling the detectors of the other series, the sliver-engaging portions of the two series extending in opposite directions and such portions of one series of detectors having downturned hooks, a normally vibrating feeler longitudinally movable below the detectors and having shoulders on its upper face, whereby a released detector having a hook will arrest the feeler and be subjected to tensile strain, a detector of the other series being subjected to compressive strain when released and engaging a shoulder of the feeler, to arrest the latter, and stopping means for the apparatus, operated by or through arrest of the feeler.

2. In apparatus of the class described, means to move and to guide a plurality of sets of slivers, stop-motion detectors controlled by the latter, a longitudinally-movable feeler to be engaged and arrested on its feeling stroke by a released detector, a spring to effect such stroke of the feeler, means to positively move it on the opposite stroke, including a rock-shaft provided with a pin, stopping means operated by or through arrest of the feeler, and means including a swinging cam-hook to engage the pin and turn the rock-shaft to automatically move the feeler away from a released detector sufficiently to free the latter.

3. In apparatus of the class described, means to move and to guide a plurality of sets of slivers, stop-motion detectors controlled by the latter, said detectors being arranged in two series and each comprising an upturned head and a laterally-extended arm to rest upon a sliver, the arms of one series having downturned hooks and being extended oppositely to the arms of the detectors of the other series, the detectors being arranged in pairs, a longitudinally-reciprocating feeler having stop-shoulders, one for each pair of detectors, to be engaged by a released detector and arrested thereby, and stopping means operated by or through arrest of the feeler.

4. In apparatus of the class described, means to move the slivers, two adjacent guide-bars arranged in parallelism, to direct the slivers, pivotally-mounted stop-motion detectors located between the guide-bars and adapted to engage and be normally maintained inoperative by the slivers, a feeler longitudinally movable between the guide-bars and below the detectors, means to normally reciprocate the feeler, engagement of the latter by a released detector arresting its movement, a bunter rendered operative by the feeler when arrested, and stopping means actuated by or through the bunter when operative.

5. In apparatus of the class described, means to move and to guide a plurality of sets of slivers, stop-motion detectors controlled by the latter, a longitudinally-movable feeler, means to yieldingly move it in one direction, means, including a cam, to move it in the opposite direction, a bunter movable into and out of the path of the cam by the reciprocation of the feeler, arrest of the latter by engagement with a released detector holding the bunter in the cam-path, and stopping means operated by or through the bunter when engaged by the cam.

6. In apparatus of the class described, means to move and to guide a plurality of sets of slivers, stop-motion detectors controlled by the latter, a longitudinally-movable feeler, means to yieldingly move it in one direction, means, including a cam, to move it in the opposite direction, a rocking bunter bodily movable into and out of the path of the cam by the reciprocation of the feeler, arrest of the latter by engagement with a released detector maintaining the bunter in the path of and to be rocked by the cam, and stopping means operated by rocking of the bunter.

7. In apparatus of the class described, means to move and to guide a plurality of sets of slivers, stop-motion detectors controlled by the latter, a longitudinally-movable feeler, means to yieldingly move it in one direction, means, including a cam, to move it in the opposite direction, a bunter movable into and out of the path of the cam by the reciprocation of the feeler, arrest of the latter by engagement with a released detector holding the bunter in the cam-path, stopping means operated by the bunter when engaged by the cam, and means actuated by said bunter to relieve the engaged detector from strain due to arrest of the feeler.

8. In apparatus of the class described, means to move and to guide a plurality of sets of slivers, stop-motion detectors controlled by the latter, a longitudinally-movable feeler to be engaged and arrested by a released detector, means to yieldingly move the feeler in one direction, means, including a rock-shaft and an operating-cam, to move it in the other direction, a pivotally-mounted bunter connected with the feeler and movable thereby bodily on its fulcrum into and out of the path of the cam, stopping means, and a knock-off lever therefor actuated by the bunter when engaged and rocked by the cam.

9. In apparatus of the class described, means to move and guide a plurality of sets of slivers in pairs, stop-motion detectors arranged in pairs to coöperate with the slivers of a set and normally maintained inoperative thereby, said detectors being located at a distance from the means for moving the slivers, a normally vibrating feeler to engage and be arrested by a detector released by failure of its sliver, a bunter, a cam to rock it when said bunter is operatively positioned by or through arrest of the feeler, stopping means actuated by rocking movement of the bunter, and a device to move the feeler away from its arresting-detector upon actuation of the stopping means, to relieve the detector from strain.

10. In apparatus of the class described, drawing-rolls and guides for the slivers, stop-motion detectors controlled by the slivers, a feeler to be engaged and arrested by a released detector, a spring to effect the feeling movement of said feeler, means to positively move it in the opposite direction, said means including a tappet-cam, a bunter, a fulcrum on which it can rock and slide, connections between the feeler and bunter, to slide the latter into the path of the cam on the positive stroke of the former, arrest of the feeler positioning the bunter in the path of and to be rocked by the cam, stopping means operated by rocking movement of the bunter, and separate means actuated by the bunter to move the feeler away from its arresting-detector when the stopping means is actuated.

11. In apparatus of the class described, drawing-rolls and guides for the slivers, stop-motion detectors controlled by the slivers, a feeler to be engaged and arrested by a released detector, a spring to effect the feeling movement of said feeler, means to positively move it in the opposite direction, said means including a cam, a bunter movable into the path of the cam by or through arrest of the feeler, stopping means, including a shipper-rod, actuated by the bunter when engaged and moved by the cam, a brake for the apparatus, a brake-actuator, and releasing means for said actuator, operated by movement of the shipper-rod when the stopping means is actuated.

12. In apparatus of the class described, a plurality of drawing and evening devices to act upon a corresponding number of sets of slivers, a common actuating mechanism for the entire series of said devices, stop-motion detectors controlled by and normally maintained inoperative by the individual slivers, a normally vibrating feeler adapted to be engaged and arrested by a detector released by failure of its sliver, stopping means operative by or through arrest of the feeler to stop said actuating mechanism and thereby effect the stoppage of all of said drawing and evening devices, and means actuated upon the operation of the stopping means to move the feeler sufficiently to release the engaged detector from strain.

13. In apparatus of the class described, a plurality of drawing and evening devices to act upon a corresponding number of sets of slivers, a common actuating mechanism for the entire series of said devices, guides for the slivers, stop-motion detectors adjacent the guides, and normally maintained inoperative by the slivers, stopping means for said actuating mechanism, operative by or through release of a detector due to failure of its sliver, to thereby stop the operation of all said drawing and evening devices, and blade-like, upright separators behind the guides, to prevent interference between the slivers of a set.

14. In apparatus of the class described, means to move the sets of slivers, a guide-bar having guide-eyes arranged in pairs to receive and direct the slivers of a set, upright separators on the guide-bar and located between the guide-eyes of a pair at the inlet side thereof, to prevent interference between the slivers directed through the guide-eyes, stop-motion detectors normally maintained inoperative by the slivers, and stopping means, operative by or through release of a detector due to failure of its sliver, to stop the means for moving all of the sets of slivers.

In testimony whereof I have signed my name to this specification in the presence of two subscribing witnesses.

CHARLES T. HAWLEY.

Witnesses:
GEORGE OTIS DRAPER,
EDWARD F. ALLEN.